United States Patent [19]

Green

[11] 3,740,154

[45] June 19, 1973

[54] MODULATED COMPOSITION FLAME PHOTOMETER

[75] Inventor: Joseph A. Green, Adelphi, Md.

[73] Assignee: International Telephone and Telegraph Corporation, Nutley, N.J.

[22] Filed: Oct. 28, 1971

[21] Appl. No.: 193,288

[52] U.S. Cl. .................. 356/187, 356/85, 356/87, 356/217
[51] Int. Cl. .............................................. G01j 3/48
[58] Field of Search ...................... 356/85, 87, 187, 356/217

[56] References Cited
UNITED STATES PATENTS 3,620,628  11/1971  Yasuda et al. ........................ 356/87
3,625,614  12/1971  Herrman et al. ...................... 356/87

OTHER PUBLICATIONS

"Analysen der Atomabsoptions-Flammenphotometrie" by Herrman, Z. Instr. 75 (1967), Pg. 101–111
"Piezoelectrically Induced Selective Flame Signal Modulation" by Mossotti et al., Applied Spectroscopy, Vol. 25, No. 3, 1971 pg. 331–341

Primary Examiner—Ronald L. Wibert
Assistant Examiner—Paul K. Godwin
Attorney—C. Cornell Remsen, Jr., Walter J. Baum, Paul W. Hemminger et al.

[57] ABSTRACT

This invention relates to an improved flame photometer. The gas to be analyzed is modulated in composition by means of a reference gas devoid of the component whose concentration is sought. This reaction is accomplished with a modulator cavity partitioned by a flexible membrane having a ferrite magnet or other magnetic material attached thereto. An electromagnet imparts a sinusoidal displacement to said ferrite magnet producing peak tidal flows of said sample gas and said reference gas alternately to a burner. An optical filter passes specific spectral components of the resultant luminosity to a photomultiplier which converts the light flux to an electrical signal. This resultant signal is electrically correlated with the modulating drive signal to obtain the amplitude of the periodic component of flame intensity occurring at the modulating frequency.

3 Claims, 2 Drawing Figures

United States Patent [19]
Green
[11] 3,740,154
[45] June 19, 1973
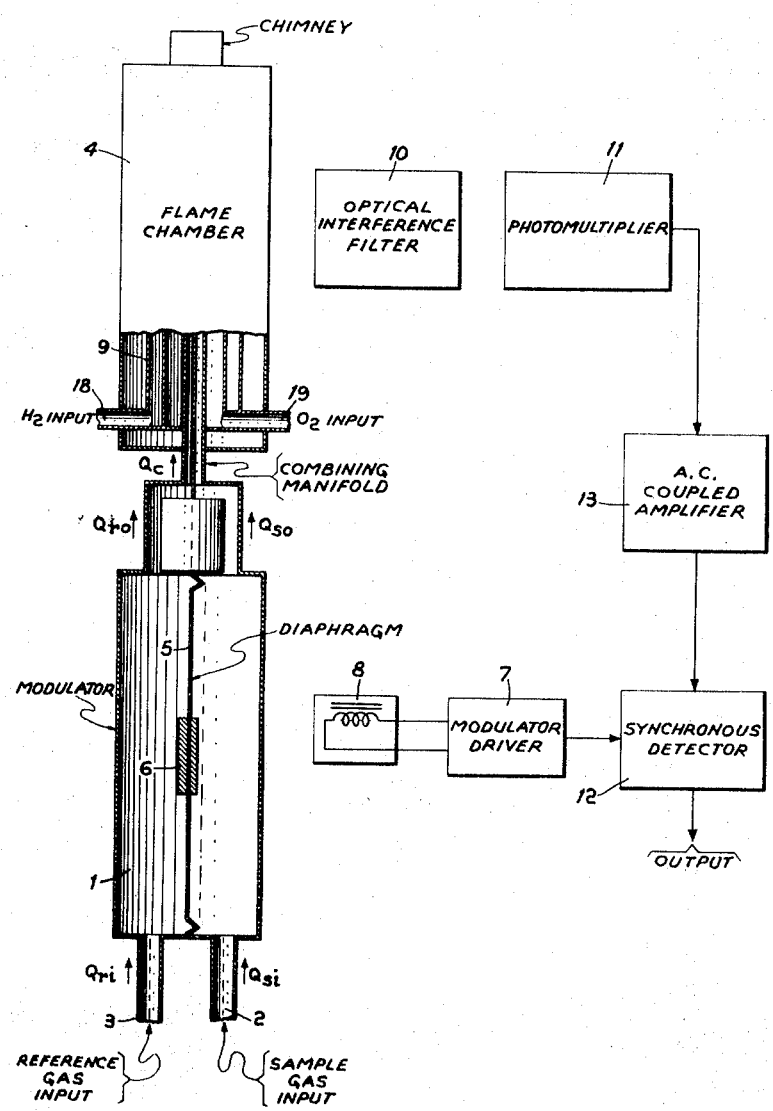

Patented June 19, 1973
3,740,154
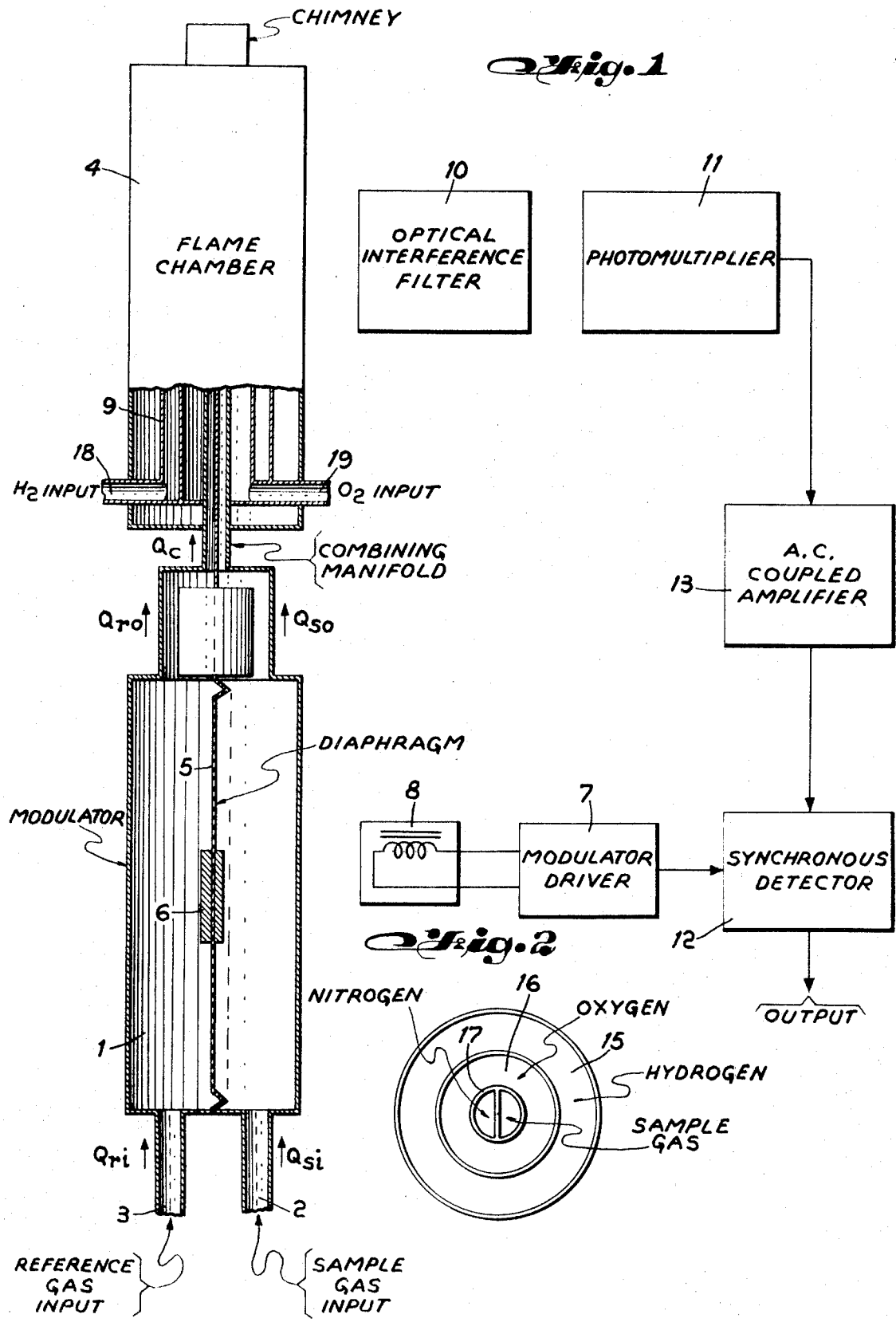

MODULATED COMPOSITION FLAME PHOTOMETER

BACKGROUND OF THE INVENTION

This invention relates to a flame photometer and more particularly to a modulated composition flame photometer.

An ultimate limit to the sensitivity of existing flame photometers is usually established by random fluctuations in the luminosity of the background flame. Temporal variations of the spectral components of the background flame that pass through any optical filters that are used produce responses at the output of the photodetector that can be interpreted erroneously as being due to variations in the composition of the gas being analyzed. Current practice invokes means for suppressing the time invariant component of this undesired flame response, but does nothing to combat the fluctuating component, including any long term drift that may be present.

SUMMARY OF THE INVENTION

It is an object of the present invention to provide a flame photometer in which the sensitivity is enhanced by reducing the effect of luminosity variations.

According to a broad aspect of the invention there is provided an improved flame photometer of the type wherein there is provided a flame chamber containing a burner for burning a stream of sample gas to be analyzed, an optical filter for passing specific spectral components of the luminosity, and a photomultiplier for converting light flux to an electrical signal wherein the improvement comprises a source of a reference gas, means for composition modulating said sample gas stream with said reference gas and means for measuring the amplitude of the periodic component of the electrical signal that occurs at the modulating frequency.

The above and other objects of the present invention will be more clearly understood from the following detailed description taken in conjunction with the accompanying drawings, in which:

BRIEF DESCRIPTION OF THE DRAWINGS

FIG. 1 is a block diagram of a flame photometer employing gas composition modulation and the associated detector circuitry; and FIG. 2 shows the burner assembly employed in the inventive flame photometer.

DESCRIPTION OF THE PREFERRED EMBODIMENT

The object of this invention is attained by composition modulating the sample gas stream supplied to the burner flame at a frequency of several tens of cycles per second and electronically correlating the output of the photodetector with the modulator drive signal. This can be more clearly explained with reference to FIG. 1.

The sample and reference gas sources are assumed available at above ambient atmospheric pressure from high impedance source; that is, these gases are forced into modulator 1 through inputs 2 and 3 at constant flow rates designated $Q_{si}$ and $Q_{ri}$ respectively and then into flame chamber 4 operated at essentially atmospheric pressure.

The reference gas such as nitrogen, and sample gas inflow rates $Q_{ri}$ and $Q_{si}$ to the modulator are adjusted to be approximately equal using known methods. A diaphragm 5 divides the modulator cavity and is given a sinusoidal displacement with an amplitude just sufficient or slightly less than that required to produce peak tidal flows equal to the reference gas or sample gas inflow rates taken individually. The modulator cell 1 consists of an approximately cylindrical cavity partitioned by flexible diaphragm 5. A small ferrite magnet or other magnetic material 6 is mounted in the center of diaphragm 5 in order that the latter can be electromagnetically driven, in the manner of a loudspeaker diaphragm, by means of modulator driver 7 controlling electromagnet 8. The electromagnets are external to the cavity itself, precluding any need for low friction gas seals. The pneumatic source impedance of the sample and reference gas supplies is high with respect to the exit impedance of the modulator chambers. Because of this, diaphragm motion does not significantly disturb the gas inflow rates but only influences the output flow from the modulated chambers.

When the above conditions are met, the gas stream from the modulator chamber 1 to the flame chamber 4 will vary in composition in the following manner: at one instant in the modulation cycle, the composition will essentially correspond to that of the input sample gas stream alone. One-half cycle later, the composition will essentially correspond to that of the reference gas stream alone. It should be noted that throughout the entire modulation cycle, despite the approximately sinusoidal composition modulation, there is no modification to the overall flow exiting from the modulator chamber to the burner 9 in flame chamber 4. This precludes undesired modulation of the flame luminosity by virtue of changes in the dynamics of the flame. Hydrogen and oxygen are fed to burner 9 through inputs 18 and 19 respectively to support combustion.

If the sample and the reference gases are identical in composition, the luminosity of the flame will be independent of the phase of the modulation cycle. However, should the sample gas contain a substance that will increase the luminosity of the flame, such as sulphur or phosphorous compounds, the flame intensity will contain a periodic component occurring at the modulation frequency.

The optical components shown in FIG. 1 are essentially identical to those used in the Melpar/Tracor photometer. Light from flame chamber 4 is filtered via optical interference filter 10 said interference filter being of the type manufactured by Baird Atomics to Tracor specifications. In this manner, only light of specific frequencies, corresponding to the burning of certain gases in the flame chamber, will pass through filter 11 and excite a photomultiplier assembly 11, such as that used in the Melpar photometer. The detection of a different gas can be accomplished by changing optical interference filter 10 to allow passage of a different frequency to the photomultiplier.

The burner assembly 9 consists of a set of triaxially disposed tubes terminating somewhat below the center of the flame chamber. The central tube is partitioned longitudinally into two halves so that a total of four independent pneumatic paths extend into the region of the flame. This is shown in more detail in FIG. 2.

Hydrogen flowing through the outer annulus 15 and oxygen flowing through the contiguous annulus 16 sustain a flame while sample and reference gas flows are each admitted to the flame by means of one of the channels provided by the partitioned central tube 17.

The output of photomultiplier 11 is coupled to synchronous detector 12 via an AC coupled amplifier 13. Synchronous detection of the photodetector output signal with a signal obtained from modulator driver 7 affords a convenient means for measuring the amplitude of the desired signal in the presence of random fluctuation. Signal-to-noise ratio enhancement can be purchased at the expense of diminished response time by recourse to extended post-detection integration times.

Such a system as just described would be useful for example, in the analysis of the eluent of a gas chromatograph. Some modification is required, if the photometer is to be used with ambient atmospheric pressure sample and reference sources. In this case, a pump downstream of the combustion chamber would be required to maintain flow, and a device such as a filter or scrubber or external source would be required to supply clean reference gas.

For a quantitative description of the modulator operation let $Q_{si}$ = sample gas inflow rate (cc/sec)

$Q_{ri}$ = reference gas inflow rate (cc/sec)

$Q_{so}$ = sample gas outflow rate from modulator (cc/sec)

$Q_{ro}$ = reference gas outflow rate from modulator (cc/sec)

$Q_c$ = composite gas flow rate to flame (cc/sec)

$Q_t$ = trace gas flow rate to flame (cc/sec)

$C_{in}$ = concentration of trace gas in sample input $C_{out}$ = concentration of trace gas in flow to flame $V$ = peak tidal amplitude produced by modulator (cc)

$(i)$ = angular frequency with which modulator is driven (radians/sec)

The gas flow rate issuing from the sample side of the modulator can be simply expressed:

$$Q_{so} = Q_{si} + V\omega\cos\omega t \quad (1)$$

The corresponding flow rate from the reference side of the modulator is:

$$Q_{ro} = Q_{ri} - V\omega\cos\omega t \quad (2)$$

Because the tidal flows on opposite sides of the modulator diaphragm are opposite in phase, the tidal flow terms in (1) and (2) differ in sign. The composite gas flow after the combining manifold is:

$$Q_c = Q_{so} + Q_{ro} = Q_{si} + Q_{ri} \quad (3)$$

Thus the gas flow rate to the flame is seen to be constant and independent of the tidal flow.

Considering the trace gas flow to the flame:

$$Q_t = C_{in}Q_{so} = C_{in}(Q_{si} + V\omega\cos\omega t) \quad (4)$$

and, dividing (4) by (3) to obtain the trace gas concentration supplied to the flame:

$$C_{out} = C_{in}[Q_{si} + V\omega\cos\omega t / Q_{si} + Q_{ri}] \quad (5)$$

Physically it is desirable that $$V\omega\cos\omega t \leq Q_{si} \quad (6)$$

and $$V\omega\cos\omega t \leq Q_{ri} \quad (7)$$

so that undirectional flow is always maintained to the burner. Otherwise, the composition within the modulator chambers would be a function of modulation amplitude, dead volume within the modulator and delivery system, etc., and the achievable modulation depth would be reduced. Optimum modulation occurs when:

$$Q_{si} = Q_{ri} = V\omega \quad (8)$$

in which case the trace gas composition supplied to the flame is fully modulated. It should be noted, however, that small departures from (8) can be tolerated without significant degradation of performance so long as conditions (6) and (7) are still satisfied.

It is to be understood that the foregoing description of specific examples of this invention is made by way of example only and is not to be considered as a limitation on its scope.

I claim:

1. An improved flame photometer of the type wherein there is provided a flame chamber containing a burner for burning a stream of sample gas to be analyzed, an optical filter for passing specific spectral components of the luminosity and a photomultiplier for converting light energy to an electrical signal wherein the improvement comprises:
   a source of a reference gas;
   means for composition modulating said sample gas stream with said reference gas, said modulating means comprising:
      a cavity having a first input coupled to said source of reference gas, a second input for receiving said sample gas and first and second outputs for delivering said reference gas and said sample gas to said burner;

a flexible diaphragm partitioning said cavity and separating said first input and said first output from said second input and second output; and means for imparting to said diaphragm a sinusoidal displacement to produce peak tidal flows of said sample gas and said reference gas to said burner equal to the reference gas and sample gas inflow rates; and means for measuring the amplitude of the periodic electrical signal corresponding to flame intensity variation occurring at the modulating frequency.

2. An improved flame photometer according to claim 1 wherein said imparting means includes:

a ferrite magnet mounted in the center of said diaphragm;

an electromagnet located outside said cavity for displacing said ferrite magnet; and means for controlling said electromagnet to impart sinusoidal displacement to said ferrite magnet.

3. An improved flame photometer according to claim 2 wherein said measuring means includes:

a synchronous detector having a first input coupled to the output of said photomultiplier and having a second input coupled to the output of said means for controlling.

* * * * *